United States Patent
Nappier et al.

(10) Patent No.: US 7,882,212 B1
(45) Date of Patent: Feb. 1, 2011

(54) METHODS AND DEVICES FOR ARCHIVING RECORDED INTERACTIONS AND RETRIEVING STORED RECORDED INTERACTIONS

(75) Inventors: Sherry Nappier, Atlanta, GA (US); Dan Spohrer, Alpharetta, GA (US); John M. Ringelman, Roswell, GA (US)

(73) Assignee: Verint Systems Inc., Melville, NY (US)

( * ) Notice: Subject to any disclaimer, the term of this patent is extended or adjusted under 35 U.S.C. 154(b) by 916 days.

(21) Appl. No.: 10/285,321

(22) Filed: Oct. 31, 2002

Related U.S. Application Data

(63) Continuation-in-part of application No. 10/136,735, filed on Apr. 30, 2002, and a continuation-in-part of application No. 10/061,469, filed on Jan. 31, 2002, and a continuation-in-part of application No. 10/061,489, filed on Jan. 31, 2002, and a continuation-in-part of application No. 10/061,491, filed on Jan. 31, 2002, and a continuation-in-part of application No. 10/058,911, filed on Jan. 28, 2002, now abandoned.

(51) Int. Cl.
   *G06F 15/173* (2006.01)
(52) U.S. Cl. .................. 709/224; 709/223; 709/204
(58) Field of Classification Search .............. 379/265.01–265.06; 707/204; 709/224, 223, 709/204
   See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,684,349 A | 8/1987 | Ferguson et al. |
| 5,101,402 A | 3/1992 | Chiu et al. |
| 5,267,865 A | 12/1993 | Lee et al. |
| 5,311,422 A | 5/1994 | Loftin et al. |
| 5,511,165 A | 4/1996 | Brady et al. |
| 5,526,407 A | 6/1996 | Russell et al. |
| 5,581,614 A | 12/1996 | Ng et al. |
| 5,597,312 A | 1/1997 | Bloom et al. |
| 5,710,591 A | 1/1998 | Bruno et al. |

(Continued)

OTHER PUBLICATIONS

"Customer Spotlight: Navistar International," Web page, unverified print date of Apr. 1, 2002.

(Continued)

*Primary Examiner*—Ramsey Refai
(74) *Attorney, Agent, or Firm*—Lawrence A. Aaronson, PC

(57) ABSTRACT

At least one contact between at least one server and at least one user is archived. The contact includes a recorded interaction between the user and the server, e.g., a recorded interaction between a customer and a customer service agent via the server. The contact is associated with a contact folder in a local storage. A portion of the contact is selected to be archived, and the time to archive the selected portion is determined. The selected portion of the contact is archived in an extended storage at the determined time. Archiving includes copying at least the content from the associated contact folder in the local storage and forwarding at least the copied content to an extended storage. A portion of the archived contact or the entire archived contact may be restored by determining that the contact is archived and retrieving the contact or the portion of the contact from the extended storage.

29 Claims, 14 Drawing Sheets

U.S. PATENT DOCUMENTS

| | | | |
|---|---|---|---|
| 5,717,879 | A | 2/1998 | Moran et al. |
| 5,742,736 | A | 4/1998 | Haddock |
| 5,790,798 | A | 8/1998 | Beckett, II et al. |
| 5,809,250 | A | 9/1998 | Kisor |
| 5,825,869 | A | 10/1998 | Brooks et al. |
| 5,926,836 | A * | 7/1999 | Blumenau .................. 711/162 |
| 5,958,016 | A | 9/1999 | Chang et al. |
| 5,964,836 | A | 10/1999 | Rowe et al. |
| 5,970,455 | A | 10/1999 | Wilcox et al. |
| 5,978,648 | A | 11/1999 | George et al. |
| 6,009,429 | A | 12/1999 | Greer et al. |
| 6,014,134 | A | 1/2000 | Bell et al. |
| 6,014,647 | A * | 1/2000 | Nizzari et al. ............... 709/216 |
| 6,018,619 | A | 1/2000 | Allard et al. |
| 6,035,332 | A | 3/2000 | Ingrassia et al. |
| 6,038,544 | A * | 3/2000 | Machin et al. ................ 705/11 |
| 6,039,575 | A | 3/2000 | L'Allier et al. |
| 6,057,841 | A | 5/2000 | Thurlow et al. |
| 6,061,798 | A | 5/2000 | Coley et al. |
| 6,076,099 | A | 6/2000 | Chen et al. |
| 6,078,894 | A | 6/2000 | Clawson et al. |
| 6,108,711 | A | 8/2000 | Beck et al. |
| 6,115,751 | A | 9/2000 | Tam et al. |
| 6,122,665 | A | 9/2000 | Bar et al. |
| 6,122,668 | A | 9/2000 | Teng et al. |
| 6,138,139 | A | 10/2000 | Beck et al. |
| 6,144,991 | A | 11/2000 | England |
| 6,146,148 | A | 11/2000 | Stuppy |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 * | 5/2001 | Beck et al. .................. 709/223 |
| 6,236,977 | B1 | 5/2001 | Verba et al. |
| 6,244,758 | B1 | 6/2001 | Solymar et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Purnam et al. |
| 6,289,460 | B1 * | 9/2001 | Hajmiragha .................. 726/28 |
| 6,301,462 | B1 | 10/2001 | Freeman et al. |
| 6,301,573 | B1 | 10/2001 | McIlwaine et al. |
| 6,324,282 | B1 | 11/2001 | McIllwaine et al. |
| 6,336,093 | B2 | 1/2002 | Fasciano |
| 6,347,374 | B1 | 2/2002 | Drake et al. |
| 6,351,467 | B1 | 2/2002 | Dillon |
| 6,370,574 | B1 | 4/2002 | House et al. |
| 6,404,857 | B1 | 6/2002 | Blair et al. |
| 6,408,064 | B1 | 6/2002 | Federov et al. |
| 6,418,471 | B1 | 7/2002 | Shelton et al. |
| 6,421,427 | B1 | 7/2002 | Hill et al. |
| 6,437,818 | B1 | 8/2002 | Ludwig et al. |
| 6,445,776 | B1 | 9/2002 | Shank et al. |
| 6,453,345 | B2 | 9/2002 | Trcka et al. |
| 6,459,787 | B2 * | 10/2002 | McIllwaine et al. .... 379/265.06 |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,510,469 | B1 | 1/2003 | Starnes et al. |
| 6,535,909 | B1 | 3/2003 | Rust |
| 6,542,602 | B1 * | 4/2003 | Elazar .................. 379/265.06 |
| 6,543,004 | B1 * | 4/2003 | Cagle et al. .................. 714/15 |
| 6,546,405 | B2 | 4/2003 | Gupta et al. |
| 6,583,806 | B2 | 6/2003 | Ludwig et al. |
| 6,603,854 | B1 | 8/2003 | Judkins et al. |
| 6,604,093 | B1 | 8/2003 | Etzion et al. |
| 6,606,657 | B1 | 8/2003 | Zilberstein et al. |
| 6,665,644 | B1 * | 12/2003 | Kanevsky et al. ........... 704/275 |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 * | 4/2004 | Eilbacher et al. ........ 379/265.03 |
| 6,738,456 | B2 | 5/2004 | Wrona et al. |
| 6,757,361 | B2 | 6/2004 | Blair et al. |
| 6,772,214 | B1 | 8/2004 | McClain et al. |
| 6,772,396 | B1 | 8/2004 | Cronin et al. |
| 6,775,377 | B2 * | 8/2004 | McIllwaine et al. .... 379/265.06 |
| 6,785,370 | B2 | 8/2004 | Glowny et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 * | 11/2004 | Wilson et al. ............... 709/225 |
| 6,870,916 | B2 | 3/2005 | Henrikson et al. |
| 6,901,438 | B1 | 5/2005 | Davis et al. |
| 6,915,314 | B2 * | 7/2005 | Jackson et al. ............. 707/204 |
| 6,959,078 | B1 | 10/2005 | Eilbacher et al. |
| 6,965,886 | B2 | 11/2005 | Govrin et al. |
| 6,993,494 | B1 * | 1/2006 | Boushy et al. ................ 705/10 |
| 7,003,517 | B1 | 2/2006 | Seibel et al. |
| 7,047,297 | B2 | 5/2006 | Huntington et al. |
| 2001/0000962 | A1 | 5/2001 | Rajan |
| 2001/0014143 | A1 | 8/2001 | Kuhn |
| 2001/0032335 | A1 | 10/2001 | Jones |
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0065911 | A1 | 5/2002 | Von Klopp et al. |
| 2002/0065912 | A1 | 5/2002 | Catchpole et al. |
| 2002/0112048 | A1 | 8/2002 | Gruyer et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2002/0184527 | A1 | 12/2002 | Chun et al. |
| 2003/0055883 | A1 | 3/2003 | Wiles et al. |
| 2003/0079020 | A1 | 4/2003 | Gourraud et al. |
| 2003/0140121 | A1 | 7/2003 | Adams |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2004/0249650 | A1 | 12/2004 | Freedman et al. |
| 2005/0138560 | A1 | 6/2005 | Lee et al. |
| 2005/0240656 | A1 | 10/2005 | Blair |
| 2006/0165003 | A1 | 7/2006 | Partridge |

OTHER PUBLICATIONS

"DKSystems Integrates QM Perception with OnTrack for Training," Web page, unverified print date of Apr. 1, 2002, unverified cover date of Jun. 15, 1999.

"PriceWaterhouseCoopers Case Study: The Business Challenge," Web page, unverified cover date of 2000.

"'OnTrack Online' Delivers New Web Functionality," Web page, unverified print date of Apr. 2, 2002, unverified cover date of Oct. 5, 1999.

Untitled. 10th Mediterranean Electrotechnical Conference vol. I pp. 124-126 (2000).

Unknown Author. "Long-distance learning," *Info World* 20(36):7276 (1998).

Abstract net.working: "An Online Webliography," *Technical Training* pp. 4-5 (Nov./Dec. 1998).

Adams et al. "Our Turn-of-the-Century Trend Watch" *Technical Training* pp. 46-47 (Nov./Dec. 1998).

Barron. "The Road to Performance: Three Vignettes," *Technical Skills and Training* pp. 12-14 (Jan. 1997).

Bauer. "Technology Tools: Just-in-Time Desktop Training is Quick, Easy, and Affordable," *Technical Training* pp. 8-11 (May/Jun. 1998).

Beck et al. "Applications of AI in Education," *AMC Crossroads* vol. 1:1-13 (Fall 1996), Web page, unverified print date of Apr. 12, 2002.

Benson and Cheney. "Best Practices in Training Delivery," *Technical Training* pp. 14-17 (Oct. 1996).

Bental and Cawsey. "Personalized and Adaptive Systems for Medical Consumer Applications," *Communications ACM* 45(5):62-63 (May 2002).

Benyon and Murray. "Adaptive Systems: from intelligent tutoring to autonomous agents" pp. 1-52, Web page, unknown date.

Blumenthal et al. "Reducing Development Costs with Intelligent Tutoring System Shells," pp. 1-5, Web page, unverified print date of Apr. 9, 2002, unverified cover date of Jun. 10, 1996.

Brusilovsky et al. "Distributed intelligent tutoring on the Web," Proceedings of the 8$^{th}$ World Conference of the AIED Society, Kobe, Japan, Aug. 18-22, pp. 1-9 Web page, univerified print date of Apr. 12, 2002, unverified cover date of Aug. 18-22, 1997.

Brusilovsky and Pesin. ISIS-Tutor: An Intelligent Learning Environment for CDS/ISIS Users,@ pp. 1-15 Web page, unverified print date of May 2, 2002.

Brusilovsky. "Adaptive Educational Systems on the World-Wide-Web: A Review of Available Technologies," pp. 1-10, Web Page, unverified print date of Apr. 12, 2002.

Byrnes et al. "The Development of a Multiple-Choice and True-False Testing Environment on the Web," pp. 1-8, Web page, unverified print date Apr. 12, 2002, unverified cover date of 1995.

Calvi and De Bra. "Improving the Usability of Hypertext Courseware through Adaptive Linking," *ACM*, unknown page numbers (1997).

Coffey. "Are Performance Objectives Really Necessary?" *Technical Skills and Training* pp. 25-27 (Oct. 1995).

Cohen. "Knowledge Management's Killer App," pp. 1-11, Web page, unverified print date of Apr. 12, 2002, unverified cover date of 2001.

Cole-Gomolski. "New ways to manage E-Classes," *Computerworld* 32(48):4344 (Nov. 30, 1998).

Cross. "Sun Microsystems—the SunTAN Story," Internet Time Group 8 (® 2001).

Cybulski and Linden. "Teaching Systems Analysis and Design Using Multimedia and Patterns." unknown date, unknown source.

De Bra et al. "Adaptive Hypermedia: From Systems to Framework," *ACM* (2000).

De Bra. "Adaptive Educational Hypermedia on the Web," *Communications ACM* 45(5):60-61 (May 2002).

Dennis and Gruner. "Computer Managed Instruction at Arthur Andersen & Company: A Status Report," *Educational Technical* pp. 7-16 (Mar. 1992).

Diessel et al. "Individualized Course Generation: A Marriage Between CAL and ICAL," *Computers Educational* 22(1/2)57-64 (1994).

Dyreson. "An Experiment in Class Management Using the World-Wide Web," pp. 1-12, Web page, unverified print date of Apr. 12, 2002.

E Learning Community. "Excellence in Practice Award: Electronic Learning Technologies," *Personal Learning Network* pp. 1-11, Web page, unverified print date of Apr. 12, 2002.

*E-Learning the future of learning*, THINQ Limited, London. Version 1.0 (2000).

Eklund and Brusilovsky. "The Value of Adaptivity in Hypermedia Learning Environments: A Short Review of Empirical Evidence," pp. 1-8, Web page, unverified print date of May 2, 2002.

Eline. "Case Study: Bridging the Gap in Canada's IT Skills," *Technical Skills and Training* pp. 23-25 (Jul. 1997).

Eline. "A Trainer's Guide to Skill Building," *Technical Training* pp. 34-41(Sep./Oct. 1998).

Eline. "Case Study: IBT's Place in the Sun," *Technical Training* pp. 12-17 (Aug./Sep. 1997).

Fritz. "ToolBook II: Asymetrix's updated authoring software tackles the Web," *Emedia Professional* 10(2):102106 (Feb. 1997).

Fritz. "CB templates for productivity: Authoring system templates foe trainers," *Emedia Professional* 10(8):6876 (Aug. 1997).

Gibson et al. "A Comparative Analysis of Web-Based Testing and Evaluation Systems," pp. 1-8, Web page, unverified print date of Apr. 11, 2002.

Hallberg and DeFiore. "Curving Toward Performance: Following a Hierarchy of Steps Toward a Performance Orientation," *Technical Skills and Training* pp. 9-11 (Jan. 1997).

Harsha. "Online Training 'Sprints' Ahead," *Technical Training* pp. 27-29 (Jan./Feb. 1999).

Heideman. "Writing Performance Objectives Simple as A-B-C (and D)," *Technical Skills and Training* pp. 5-7 (May/Jun. 1996).

Heideman. "Training Technicians for a High-Tech Future: These six steps can help develop technician training for high-tech work," pp. 11-14 (Feb./Mar. 1995).

Hollman. "Train Without Pain: The Benefits of Computer-Based Training Tools," pp. 1-11, Web page, unverified print date of Mar. 20, 2002, unverified cover date of Jan. 1, 2000.

Klein. "Command Decision Training Support Technology," Web page, unverified print date of Apr. 12, 2002.

Koonce. "Where Technology and Training Meet," *Technical Training* pp. 10-15 (Nov./Dec. 1998).

Kursh. "Going the distance with Web-based training," *Training and Development* 52(3):5053 (Mar. 1998).

Larson. "Enhancing Performance Through Customized Online Learning Support," *Technical Skills and Training* pp. 25-27 (May/Jun. 1997).

Linton et al. "OWL: A Recommender System for Organization-Wide Learning," *Educational Technical Society*3(1):62-76 (2000).

Lucadamo and Cheney. "Best Practices in Technical Training," *Technical Training* pp. 21-26 (Oct. 1997).

McNamara. "Monitoring Solutions: Quality Must Be Seen and Heard," *Inbound /Outbound* pp. 66-67 (Dec. 1989).

Merrill. "The New Component Design Theory: Instruction design for courseware authoring," *Instructional Science* 16:19-34 (1987).

Minton-Eversole. "IBT Training Truths Behind the Hype," *Technical Skills and Training* pp. 15-19 (Jan. 1997).

Mizoguchi. "Intelligent Tutoring Systems: The Current State of the Art," *Trans. IEICE* E73(3):297-307 (Mar. 1990).

Mostow and Aist. "The Sounds of Silence: Towards Automated Evaluation of Student Learning a Reading Tutor that Listens" *American Association for Artificial Intelligence*, Web page, unknown date Aug. 1997.

Mullier et al. "A Web base Intelligent Tutoring System," pp. 1-6, Web page, unverified print date of May 2, 2002.

Nelson et al. "The Assessment of *End-User Training Needs*," *Communications ACM* 38(7):27-39 (Jul. 1995).

O'Herron. "CenterForce Technologies' CenterForce Analyzer," Web page, unverified print date of Mar. 20, 2002, unverified cover date of Jun. 1, 1999.

O'Roark. "Basic Skills Get a Boost," *Technical Training* pp. 10-13 (Jul./Aug. 1998).

Pamphlet. "On Evaluating Educational Innovations'," authored by Alan Lesgold, unverified cover date of Mar. 5, 1998.

Papa et al. "A Differential Diagnostic Skills Assessment and Tutorial Tool," *Computer Education* 18(1-3):45-50 (1992).

Phaup. "New Software Puts Computerized Tests on the Internet: Presence Corporation announces breakthrough Question Mark™ Web product," Web page, unverified print date of Apr. 1, 2002.

Phaup. "Question Mark Offers Instant Online Feedback for Web Quizzes and Questionnaires: University of California assist with Beta Testing, Server scripts now available to high-volume users" Web page, unverified print date of Apr. 1, 2002, unverified cover date of May 6, 1996.

Phaup. "QM Perception™ Links with Integrity Training's WBT Manager™ to Provide Enhanced Assessments for Web-Based Courses," Web page, unverified print date of Apr. 1, 2002, unverified cover date of Mar. 25, 1999.

Phaup. "Question Mark Introduces Access Export Software," Web page, unverified print date of Apr. 2, 2002, unverified cover date Mar. 1, 1997.

Piskurich. "Now-You-See-'Em, Now-You-Don't Learning Centers," *Technical Training* pp. 18-21 (Jan./Feb. 1999).

Read. "Sharpening Agents' Skills," pp. 1-15, Web page, unverified print date of Mar. 20, 2002, unverified cover date of Oct. 1, 1999.

Reid. "On Target: Assessing Technical Skills," *Technical Skills and Training* pp. 6-8 (May/Jun. 1995).

Stormes. "Case Study: Restructuring Technical Training Using ISD," *Technical Skills and Training* pp. 23-26 (Feb./Mar. 1997).

Tennyson. "Artificial Intelligence Methods in Computer-Based Instructional Design," *Journal of Instructional Development* 7(3)17-22 (1984).

The Editors, Call Center. "The Most Innovative Call Center Products We Saw in 1999," Web page, unverified print date of Mar. 20, 2002,, unverified cover date of Feb. 1, 2000.

Tinoco et al. "Online Evaluation in WWW-based Courseware," *ACM* pp. 194-198 (1997).

Uiterwijk et al. "The virtual classroom," *InfoWorld* 20(47):6467 (Nov. 23, 1998).

Watson and Belland. "Use of Learner Data in Selecting Instructional Content for Continuing Education," *Journal of Instructional Development* 8(4):29-33 (1985).

Weinschenk. "Performance Specifications as Change Agents," *Technical Training* pp. 12-15 (Oct. 1997).

PCT International Search Report, International Application No. PCT/US03/02541, mailed May 12, 2003.

Witness Systems promotional brochure for eQuality entitled "*Bringing equality to eBusiness*".

Witness Systems promotional brochure for eQuality entitled "*Building Customer Loyalty Through Business-Driven Recording of Multimedia Interactions in your Contact Center*," (2000).

Edward L. Nash, *Database Marketing*, 1993, pp. 158-165, 172-185, McGraw Hill, Inc., USA.

\* cited by examiner

METHODS AND DEVICES FOR ARCHIVING RECORDED INTERACTIONS AND RETRIEVING STORED RECORDED INTERACTIONS

CROSS-REFERENCE TO RELATED APPLICATIONS

This application is a continuation-in-part of a commonly assigned U.S. patent application Ser. No. 10/136,735, filed Apr. 30, 2002 as a Continuation-in-Part of U.S. patent applications No. 10/061,469, 10/061,489, and 10/061,491, filed Jan. 31, 2002, and U.S. patent application Ser. No. 10/058,911, filed Jan. 28, 2002 now abandoned. These applications are hereby incorporated by reference.

BACKGROUND

The present invention is directed to methods and devices for processing recorded interactions. More particularly, the present invention is directed to methods and systems for archiving recorded interactions between a server and a user and for retrieving stored recorded interactions.

For systems employing interactions between a user and server, it is often desirable to be able to view the interactions, ideally in a manner that is transparent to the user. This is particularly desirable in a context such as sales, customer service, and e-commerce, where interactions between customers and customer service agents via a web connection or a phone connection are important indicators of customer satisfaction.

Attempts have been made to recreate interactions between a user and a server. For example, click stream analysis procedures have been used to recreate interactions between a web user and a web service provider. This type of procedure is analogous to reviewing and analyzing the script to a movie. While this procedure reveals some information about the interaction between the server and the user, it does not provide a clear tangible picture of special effects, the environment, chemistry between the user and the server, etc.

Other attempts have been made to replay recorded interactions between a server and a user. However, these attempts are typically implemented at the server, consuming a lot of server resources, and are suitable only for a particular type of server. In addition, these approaches typically do not distinguish between interactions that are considered important and interactions that are not important. Thus, a lot of time and resources are wasted on storing and replaying unimportant recorded interactions.

There is thus a need for a technique for selectively recording data captured during an exchange between a server and a user. There is further a need for storing recorded interactions in an efficient manner.

SUMMARY

It is an object of the present invention to provide a method and system for archiving data exchanged between a user and a server in an efficient and reliable manner. It is a further object of the present invention to provide a method and system for retrieving stored data exchanged between the user and the server in an efficient and reliable manner.

According to one embodiment, these and other objects are met by a method and apparatus for archiving at least one contact between at least one server in an enterprise and at least one user. A contact that includes a recorded interaction between the server and the user and is associated with a contact folder in a local storage is selected to be archived. The recorded interaction satisfies at least one predetermined business rule, and all contacts that satisfy the same business rule are associated with the same contact folder. A portion of the contact is selected to be archived, and a time to archived the selected content is determined. The selected portion of the contact is then archived in an extended storage at the determined time.

According to an exemplary embodiment, archiving is performed by extracting the contact from the associated contact folder in the local storage and forwarding the extracted contact to an extended storage.

According to another embodiment, a method and apparatus are provided for retrieving at least one contact between at least one server in an enterprise and at least one user. At least one stored contact including a recorded interaction between the server and the user and associated with a contact folder in a local storage is selected. The entire contact may be selected, or a portion of the contact may be selected to be retrieved. A determination is made whether the selected contact is archived or stored locally. The selected contact or portion of the contact is then retrieved from an appropriate storage location, depending on whether the selected contact is archived or stored locally.

Further objects, advantages and features of the present invention will become more apparent when reference is made to the following description taken in conjunction with the accompanying drawings.

DETAILED DESCRIPTION

According to exemplary embodiments, contacts between a server and a user are archived, and archived contacts are restored. The contacts may be archived in an extended storage. Eventually, the archived contacts may be dismissed and purged, thus making efficient use of storage capacity.

In the following description, the server is referred to as a web server, and the user is referred to as a web browser. It will be appreciated, however, that the invention may be applicable to other types of servers and users.

Figure 1A:
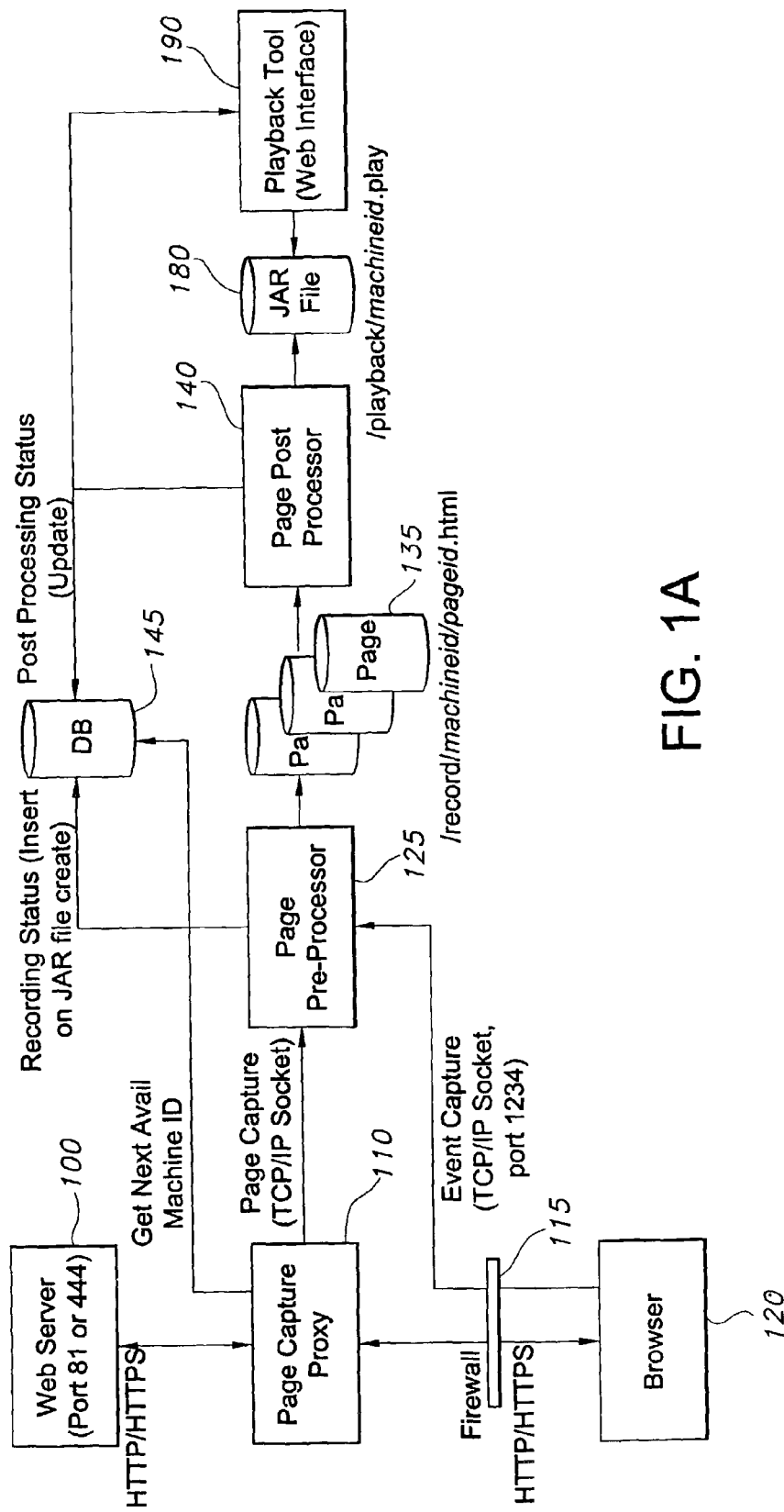
FIG. 1A illustrates an exemplary implementation of a system for processing captured data according to an exemplary embodiment.

FIG. 1A illustrates an exemplary system for recording, capturing, and playing back interactions in which the invention may be implemented. The system includes a server, such as a web server 100, a data capturing module, such as a page capture module 110, and a user, such as a web browser 120. Although only one web server 100, page capture module 110, and web browser 120 are depicted in FIG. 1A, it will be appreciated that the invention is applicable to any number of servers, data capturing modules, and users.

The web browser 120 may be implemented in a personal computer, a telephone, etc. The web server 100 may be implemented as a server supporting any operating system, e.g., Unix, Linux, NT or Windows 2000. Although described as a server handling web connections, the server 100 may also handle phone connections.

The page capture module 110 is arranged between the web server 100 and the web browser 120. For security purposes, a firewall 115 may separate the web browser 120 and the page capture module 110.

The page capture module 110 operates independently from the web server 100 and the web browser 120. Thus, the page capture module 110 does not need to be customized for each type of web server but may be used with any web server, supporting any operating system.

Although the page capture module 110 operates independently from the web server 100 and the web browser, it may be implemented in the same device as the web server 100 or the web browser 120.

The page capture module 110 captures pages and other data exchanged between the web server 100 and the browser 120. Pages and other data may be captured continually or at designated intervals or time windows. The page capture module 110 may also record these pages and other data, or recording may be performed in a separate recorder server connected to the page capture module.

Each web browser 120 is assigned a unique machine identity (ID) by the web server 100. A persistent machine ID cookie may be created by the web server 110 and stored at the web browser 120 for this purpose. All pages served to a particular web browser 120 are identified and grouped by the machine ID. Although the module 110 is described as a page capture module, according to exemplary embodiments, other types of data may also be captured. For example, events and attributes may be captured. An "attribute" may be defined as a single bit of data about an event. Attributes may be captured in a manner similar to that in which pages are captured, as described above.

For event capturing, according to an exemplary embodiment an event capture module captures user side events and delivers these to the page capture module 110. The event capture module may be implemented as an applet 130 that is downloaded to the web browser 120. For the purposes of this application, an "applet" may be defined as a Java application which is configured to run within a Java-enabled browser. Applets are a way to develop user interfaces that mimic traditional desktop user interfaces in a browser environment. Java is a platform independent application development language that is used to develop stand-alone applications as well as browser-based applications.

Although shown as a separate component, the event capture applet 130 is stored at the browser, with parameters such as the web browser machine ID, the host Internet Protocol (IP) address, and the current page name. The event capture applet 130 may be notified, for example, by JavaScript embedded in the current page, whenever an event needs to be recorded. The event capture applet 130 records events such as: page load, page unload, page scroll, page resize, and browser exit. The event capture applet 130 sends captured events to the page capturing module 110 via, for example, a Transmission Control Protocol/Internet Protocol (TCP/IP) socket connection on port 80 (or port 443 for secure exchanges).

Pages and other data captured during exchanges between the web server 100 and the web browser 120 at the page capture module 110 are sent from the page capturing module 110 to a page preprocessor 125 via, e.g., a TCP/IP socket.

According to an exemplary embodiment, each captured page is assigned a unique page ID and is associated with a specific browser user machine ID. Each page may also contain the date and time that the page was captured and the page status (recording, processing, playback, etc.) After pages are captured, this information is extracted from the captured page, and a new record is inserted into a database 145.

The page preprocessor 125 acts as a recorder server and stores the captured data in a device such as a database 145. The pages 135 are then passed on to the page post-processor 140. Alternatively, the page capturing module 110 may perform this recording. To reduce the amount of storage necessary, only predetermined portions of data may be stored, e.g., the request portion or the response portion. Also, only data satisfying predetermined rules, e.g., rules indicating timing, may be stored. When the captured pages are recorded, identifying information may also be recorded, e.g., a session record ID, a date/time of recording, a machine ID, etc. Also, for interactions such as phone calls between a customer service agent and a customer, portions of the phone call may be captured.

An exemplary page capturing module and page preprocessor are described in more detail in the afore-mentioned application Ser. No. 10/061,469.

A post-processing module 140 determines which captured data satisfies predefined rules, e.g., business rules, and records this data in a file 180, such as a Java Archive (JAR) file. The database 145 is updated to indicate what captured data has been selected and recorded for playback. This is described in more detail below with reference to FIG. 1B.

A playback tool 190 selects recorded data from the database 180, using the information in the database 145. An exemplary playback tool is described in more detail in the afore-mentioned application Ser. No. 10/061,491.

Although not shown in the interest of simplifying the illustrations, it will be appreciated that the system in FIG. 1A may also include other components, e.g., configuration files used for processing.

Figure 1B:
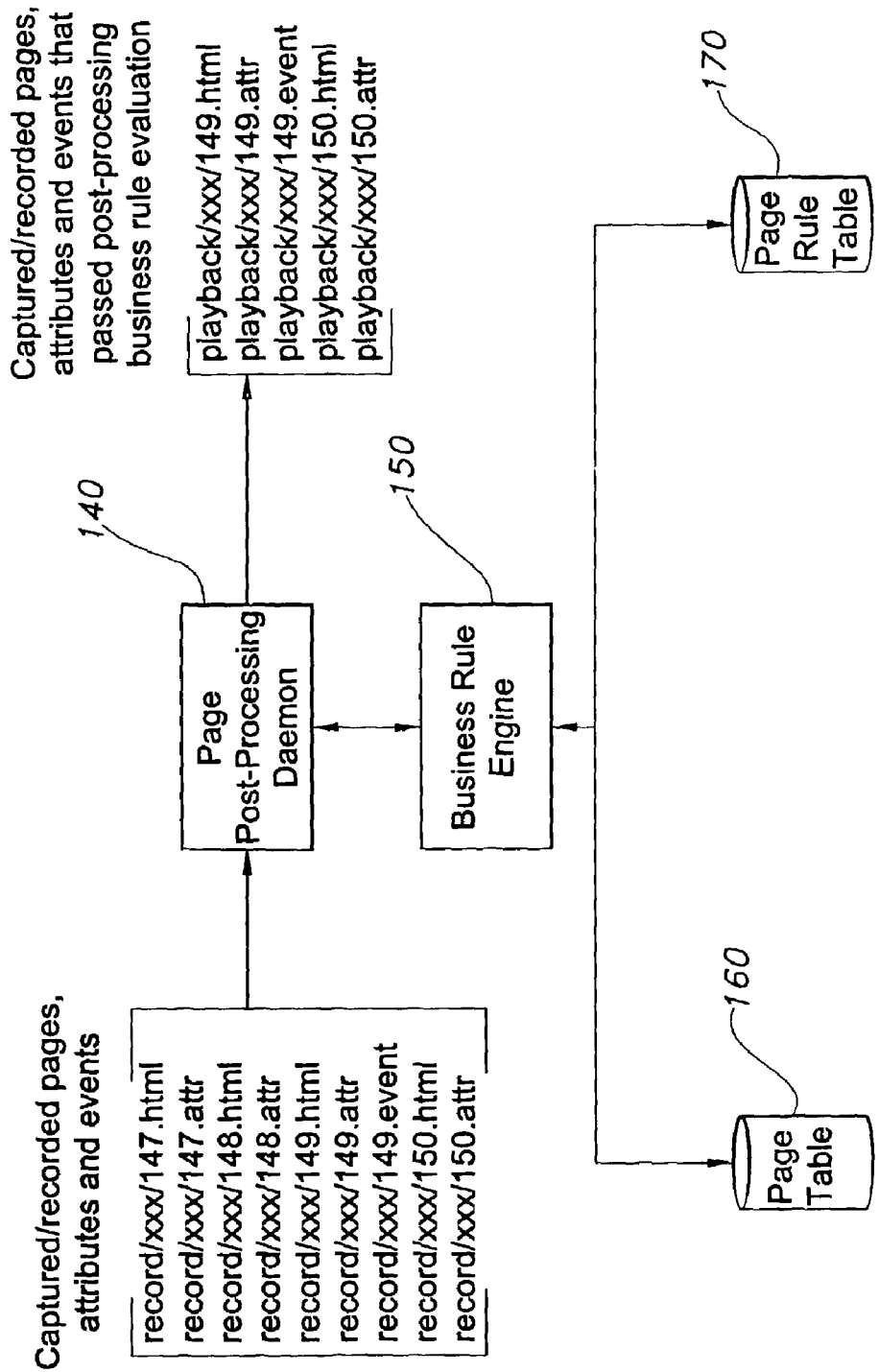
FIG. 1B illustrates in detail an exemplary system for processing captured data according to an exemplary embodiment.

FIG. 1B illustrates in detail an exemplary system for processing captured data according to an exemplary embodiment. Captured and recorded pages, attributes, and events are fed to a page post-processing program running on a page post-processor 140. A business rules engine 150 delivers business rules to the post-processor 140 that evaluates the captured/recorded pages to determine whether they satisfy the business rules.

According to exemplary embodiments, business rules are applied to the recorded data in the business rule engine 150 to determine whether a page should be saved for playback. A business rule may be defined as a statement that defines or constrains some aspect of a business. A business rule may apply to data attributes of the contact, irrespective of the source, and/or a portion of the spoken conversation as evaluated by speech recognition technology. The business rule asserts business structure or controls or influences the behavior of the business.

Data from a page table database 160 and a page rule table database 170 may be used in the evaluation by the business rule engine 150. Pages that satisfy the business rules are recorded for future playback. The page table and page rule database are updated after post-processing.

When a set of captured pages is identified as a session, then a session record is created of the identified session during post-processing. The session identification information may be stored in a session table, such as that shown in FIG. 2C.

An example of a comparison of business rule with captured data may be determining whether the captured data is an interaction resulting in a sale greater than a predetermined number of dollars, determining whether an interaction was longer than a predetermined number of minutes, etc. As another example, a business rule may state that the current page is to be recorded and all previous pages for that machine ID in that session. Also, a business rule comparison may be in the form of voice recognition. For example, a business rule employing speech recognition technology may state that an interaction is to be stored if the caller says "cancel my account".

According to exemplary embodiments, pages that do not satisfy the business rules are deleted.

According to an exemplary embodiment, the post-processing program appends the recorded JAR file to the playback JAR file in the playback directory for the current machine ID. If a playback file does not exist for the specified machine ID, the post-processing program may create one.

Images are retrieved for saved pages.

According to exemplary embodiments, events may be recorded as a text file using XML. The file has the same name as the page that generated the event.

A time period may be set for retaining recorded data, e.g., 30 minutes. This time period may be used in determining whether a page is part of a session, and pages that are part of the same session may be grouped for future playback.

Selection and storage of data for future playback are described in more detail in the above-referenced U.S. patent application Ser. No. 10/061,489, filed Jan. 31, 2002.

While the examples above discuss how captured pages are selectively recorded, the invention is not limited to selectively recording captured pages. According to exemplary embodiments, any type of data captured during an interaction between a user and a server may be selectively recorded. For example, events and attributes may be selectively recorded. Also, portions of a phone call between, e.g., a customer service agent and a customer, may be captured.

Figure 2:
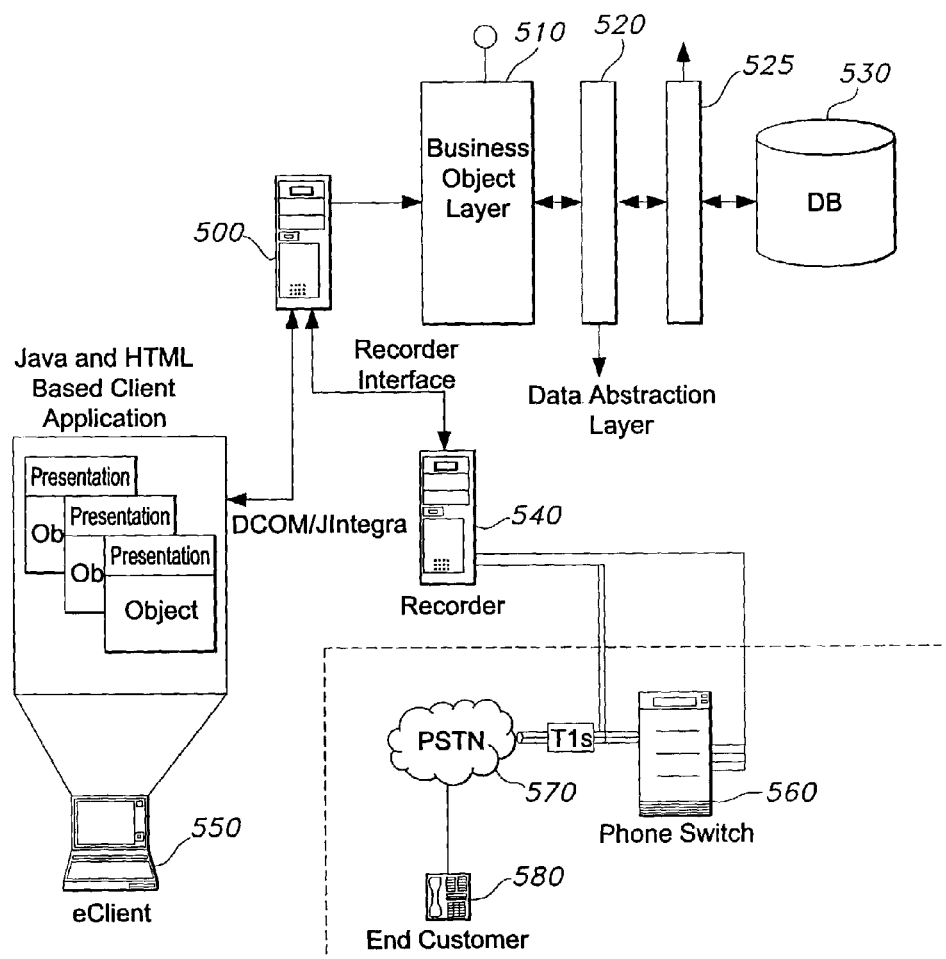
FIG. 2 illustrates an exemplary system for capturing and recording exchanges between a server and a user.

According to an exemplary embodiment, business rules are applied to captured pages using an applications server such as the server 500 shown in FIG. 2. The server 500 may be implemented as a Component Object Model (COM) based server. According to an exemplary embodiment, the server 500 includes a business rules engine such as the engine 150 shown in FIG. 1B, a scheduled rules processor, a business object layer (BOL) 510, a data abstraction layer (DAL) 520 and 525 and a repository or database 530. Alternatively, the database 530 may be included as a separate entity, e.g., if a large load is expected.

Attributes of contacts and metadata may be stored in the database 530, as well as business rule data populated and manipulated by a business rules editor. The server 500 communicates with the database 530 to obtain the business rules. The engine 150 in the server 500 applies the business rules to the captured data and communicates with a recorder server 540 for recording the captured data that satisfies predetermined business rules. The servers 500 and 540 may be implemented separately as shown in FIG. 2 or in the same device.

The BOL 510 interfaces with both the business rule editor applet and the DAL 520 and 525 to manage traffic to and from the database 530.

The recorder server 540 communicates with an end user via, e.g., a phone switch 560 and a PSTN 570. The phone switch may include, e.g., a private branch exchange (PBX) and an automatic call device (ACD).

According to an exemplary embodiment, exchanged data may be recorded from one or more points between the user 580 and the phone switch 560, a point between the phone switch and the server 500, or from a point between the client (agent) 550 and the server 500. This is described in more detail in the afore-mentioned U.S. patent application entitled "Method and System for Selectively Dedicating Resources for Recording Data Exchanged Between Entities Attached to a Network", filed on Apr. 30, 2002, and incorporated herein by reference.

According to an exemplary embodiment, business rules may be added, deleted, copied, pasted, and or modified by a user, such as a supervisor, using a business rules editor implemented, e.g., on a client computer 550 as shown in FIG. 2. The client computer 550 communicates with the server 500, in which the business rules engine may be implemented. The client computer may be implemented as a browser-based application, utilizing Java applets and HTML, and interfacing with some COM-Java bridging tool (Jintegra or R-JAX) to allow the Java-based client to communicate with the COM-based server. The business rules editor may be a Java applet running in a browser (MSIE or NN) on the client machine such as the computer 550 shown in FIG. 2.

The applet may communicate to COM objects on the server 500 using a COM-Java bridging tool. This provides the capability for the applet to access the COM objects as though they were Java objects. The editor applet may be integrated with a category manager and user security administrator applets into what appears to the user to be one application. The major tasks involved in the applet, with regard to manipulating the rules and the tree control, are detailed below. For the user-initiated tasks, it is assumed that the user has the rights to perform the task.

According to an exemplary embodiment, the business rules repository may be accessed by multiple users simultaneously. Multi-user access is handled smoothly and without conflict or collision.

Much of the information used by the business rules editor to create the rule definition may be acquired from other sources including but not limited to Computer Telephony Integration (CTI) data, external data, third party software applications, a speech recognition system, etc. Event attributes, user names and categories may exist somewhere in the system for easy acquisition by the editor. For example, a category manager generates category information for use by the business rules editor to designate where a contact should be catalogued, and an attribute type manager, which is used for defining the attributes of the events generated during a contact. It is these attributes whose value comparisons make up the condition part of the business rule. The system components also include a user security administrator which defines the users of the system. This user information may be used by the business rules editor for building the condition, setting notifications and checking editing rights.

The business rules editor application may be modeled on the "explorer" format, displayed via a user interface as a split window containing a tree control on the left, and on the right, an area containing an interface for defining the properties of the item selected in the tree. Management of business rules is described in more detail in the afore-mentioned U.S. patent application entitled "Methods and Systems for Categorizing and Cataloguing Recorded Interactions", filed Apr. 30, 2002.

According to an exemplary embodiment, there may be two application-defined folders: business rules and archived rules. These folders cannot be deleted or renamed by the user. The business rules folder is a stationary part of the folder tree and acts simply as a default. An archived rules folder may also appear, marked for example with a star, in each rule folder. The archived rules folder contains the older versions of rules which have been modified.

As indicated above, interactions may be recorded based on whether or not they satisfy predetermined business rules. Alternatively, interactions may be captured randomly using, e.g., a randomizer included in the business rules engine. This is described in more detail in the afore-mentioned application entitled "Methods and Systems for Categorizing and Cataloguing Recorded Interactions", filed Apr. 30, 2002.

According to exemplary embodiment, contacts are categorized and stored based upon business rules.

Categorization is a method for users to group contacts in a way that is meaningful. Each category contains information, called properties, that describes itself, as well as a means for accessing the contacts that are "grouped" in the category. Categorization is described in more detail in the aforementioned U.S. patent application entitled "Methods and Systems for Categorizing and Cataloguing Recorded Interactions", filed Apr. 30, 2002.

According to an exemplary embodiment, contact folders are storage units for contacts. Considering a contact as a single customer interaction that may be comprised of one or more events and some content representing contacts in a machine readable form, a contact folder is a way of organizing and grouping contacts in the user's view and controlling security access to the contacts. The contact folder may be defined conceptually as a repository for a contact. Contact folder creation and management are described in more detail in the U.S. patent application entitled "Methods and Systems for Categorizing and Cataloguing Recorded Interactions", filed Apr. 30, 2002.

Figure 3A:
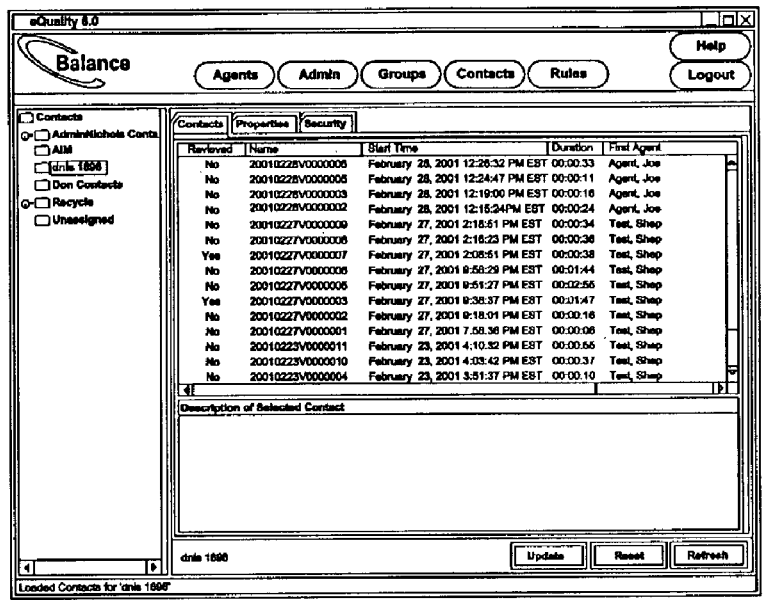
FIGS. 3A-3F exemplary screen shots for managing contact folders.

According to an exemplary embodiment, contacts may be listed by contact folder on a user interface. FIG. 3A illustrates an exemplary contact list screen shot displayed upon selection of a "contacts" tab. On the left of the screen are the contact folders and sub-folders. A user is presented with all folders that meet these criteria: folders for which the user has been given any folder-level permissions, folders for which the user is a member of a group, and that group has been given folder-level permissions, and additionally, if this user has a QA Reviewer role, folders where the user's specific QA Reviewer role was assigned to the folder. The list view also includes folders which were created by this, or other, users, as well as auto-created folders for AIM, live monitor, and search. If the user has administrative permissions, the list view may also include the unassigned folder and the recycle folder. Also, according to an exemplary embodiment.

On the right of the screen are the contacts. For each contact, the following information is listed: contact date and time, contact name, received by, contact media type icon with agent name, supervisor name at time of recording, and contact duration (HH:MM:SS). Recording type (AIM, business rule, live monitor) may also be listed. The contact date time may be expressed as MM/DD/YYYY HH:MM:SS AM. The date may be formatted according to client's regional locale Euro and US). The contact name may be formatted according to YYYYMMDD9999999 (date of the contact followed by a sequential number).

According to an exemplary embodiment, the contact media type may begin with an icon indicating the primary media type of the call (interactive voice recognition (IVR), web, inbound call, outbound call, inbound email, outbound email). This may be followed by the name of the first agent on the contact, if there was an agent.

The agent's supervisor at the time of the recording may be displayed. If there was no agent, this may be blank. If the agent had no supervisor, this may read "unassigned" or may be left blank.

The contact duration may be displayed for voice contacts or any other kind of contact.

The recording type may also be shown, indicating one or more reasons why this contact was stored, e.g., business rule trigger, AIM, or a Live Monitor, or some combination.

There may be a review status icon that is present if the contact has been reviewed. Also, there may be a review history displayed on the screen, indicating who revised the contact and when. Contacts may be reviewed by more than one person, any number of times.

The user may type text into the contact description area for the contact which is selected in the area above.

The user may select a contact for replay from the contact list. Upon selection, the events and attributes of the contact may be displayed.

When a contact is replayed, the contact list view is updated to indicate that the contact has been reviewed. For example, an icon is generated. Also, information is added indicating who reviewed the contact. The date and time that the contact was selected for replay and the date and time that the replay ended may be also be provided. This data may be used for reporting purposes.

Contact folder management is described in more detail in the afore-mentioned application entitles "Methods and Systems for Categorizing and Cataloguing Recorded Interactions", filed Apr. 30, 2002.

Referring to FIG. 3A, a user may choose to manage contact folders by selecting the target contact folder in the left panel of a screen. Assume the user is known to the system and has been granted the ability to manage contact folders. The user selects the target folder to cause the contents of the folder to be displayed as shown in FIG. 3A or the root word "contacts", bringing up the popup menu shown in FIG. 3C. Alternatively, the user may right click anywhere in the contact folder tree to bring up the popup menu shown in FIG. 3C. Using the popup menu, the user may select "NEW" to create a new folder.

Figure 3B:
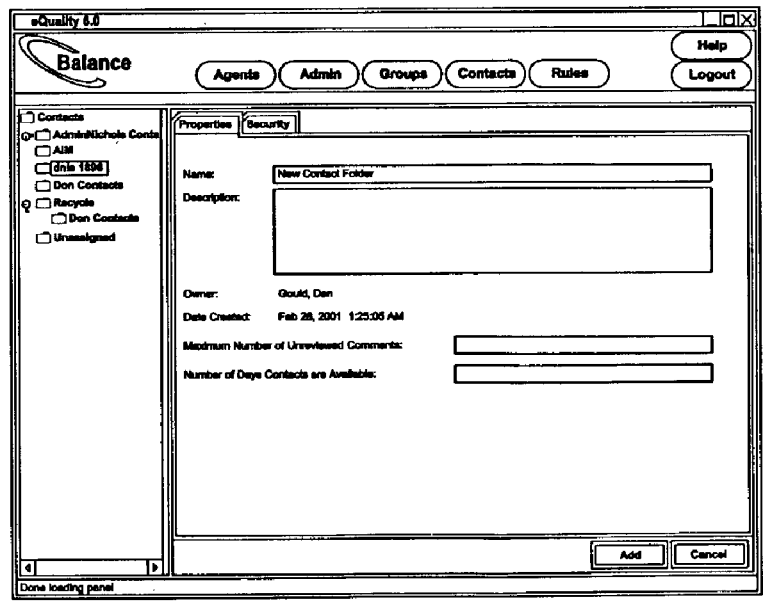
Figure 3C:
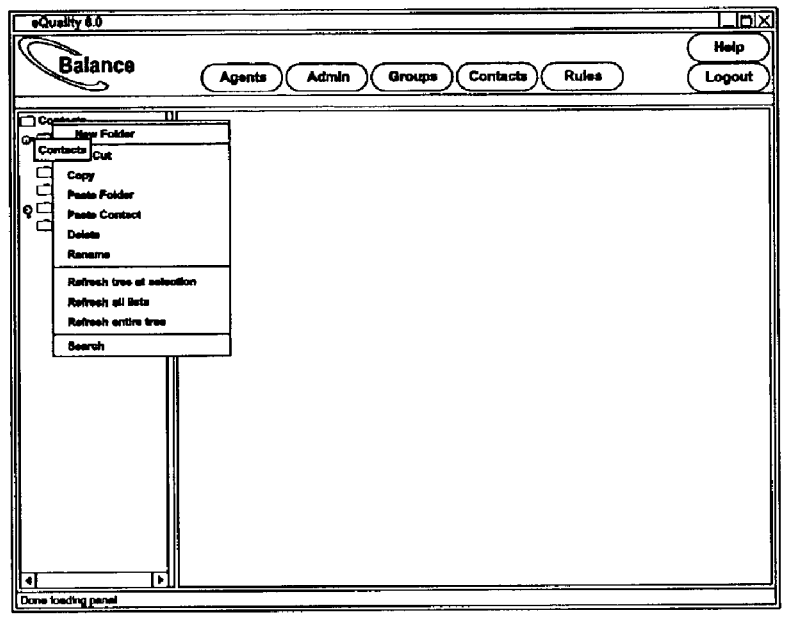
Figure 3D:
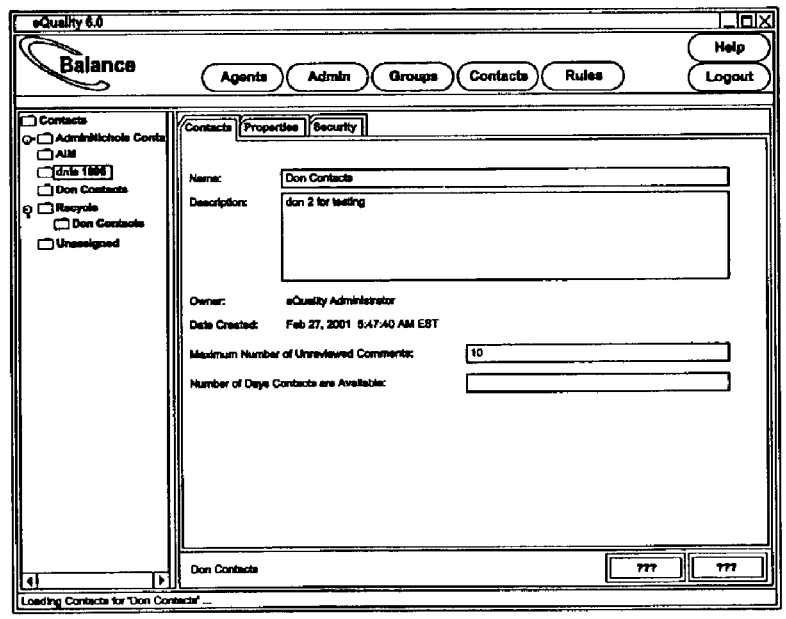
Figure 3E:
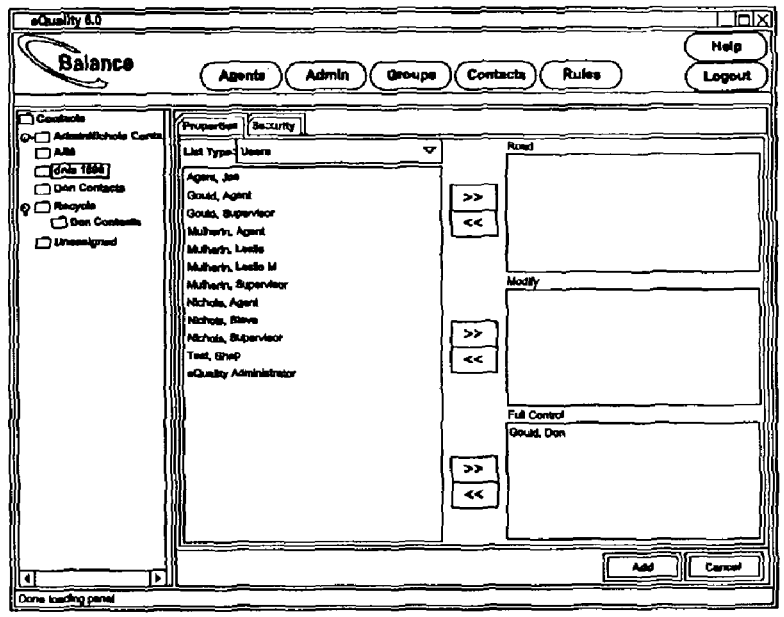

Assuming that the folder is new, using the add properties tab as shown, e.g., in FIG. 3B, the user enters a new name, description, and maximum number of unreviewed contacts, and number of day's contacts are available. Then, using the screen shown in FIG. 3E, the user selects the security tab. Next, the user selects the user and the level of access. Then, the supervisor selects the ADD button. A new contact folder is thus created, and the screen returns to the contact tab.

Figure 3F:
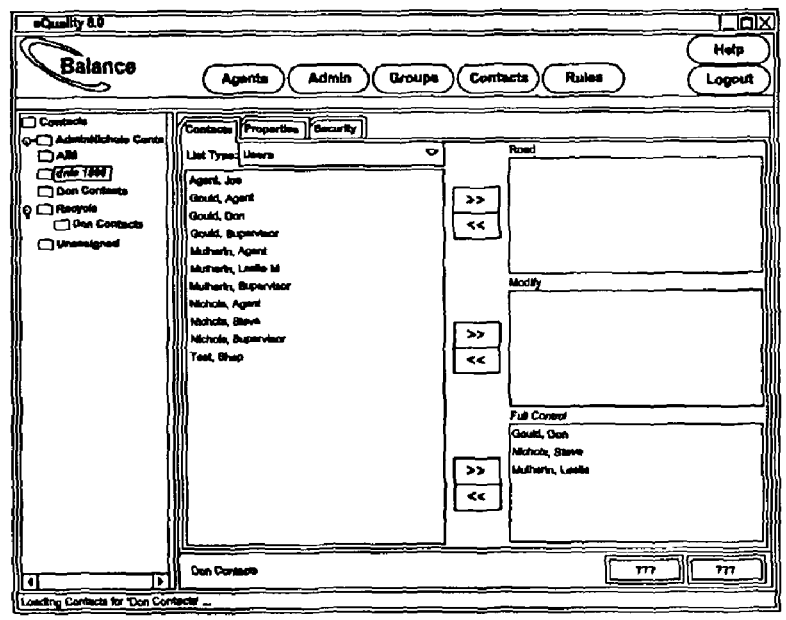

For updating a contact folder, the user selects the contact folder to be updated using a screen such as that shown in FIG. 3A. The user selects the properties tab and modifies the properties, using the screen shown in FIG. 3D. The user selects the security tab and modifies the security using the screen shown in FIG. 3F. The user selects the update button to update or the reset button to undo changes.

The contact folders may be deleted, copied, cut, pasted, renamed in a similar manner.

Over time, as contacts and folders are deleted (from the user's perspective), the contacts may be associated with the recycle folder. There may also be an aging process for contacts in a folder so that they automatically move to the recycle folder after some specified number of days, which is system configurable, and can be overridden at the folder level.

When a contact folder is moved to the recycle folder, all contact associations remain in the folder. Any active business rule that is associated with the contact folder and that has no other contact folder associations, may be made inactive. Contacts associated with the recycle folder will have no associations with other contact folders at the same time.

When a user is inactivated, the inactive user's name may be removed from the folder permission for each folder.

In addition to the recycle folder, according to an exemplary embodiment, an archive storage is provided for storing contacts. According to this embodiment, the content and/or associated metadata in a contact may be moved from a local drive on the server 500 to an extended storage system, e.g., a tape archive system, a network line file store, etc. Then, the archived data may be restored onto the local driver for playback.

Figure 4:
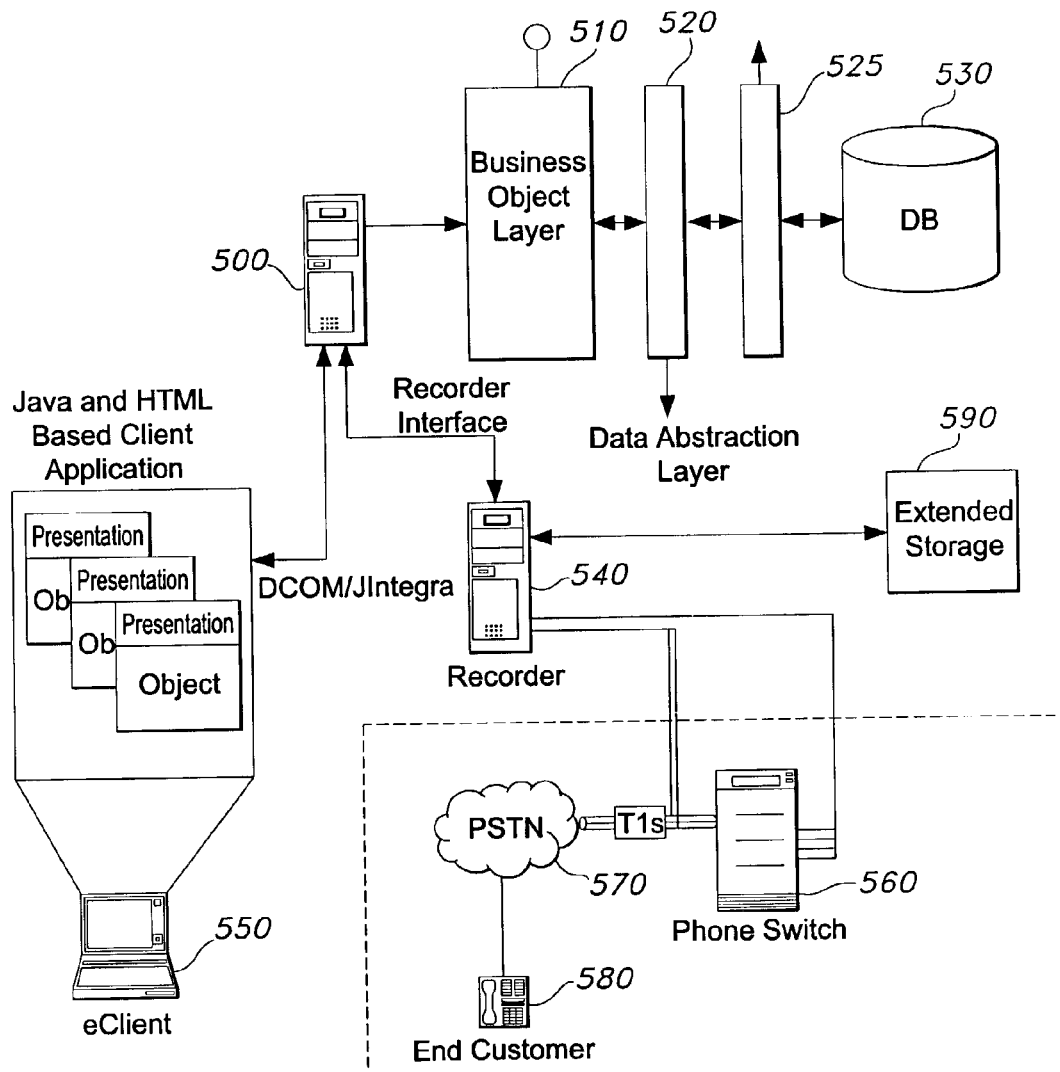
FIG. 4 illustrates an exemplary system for archiving contacts.

According to an exemplary embodiment, archiving may be performed under the control of a user, a server, a database, and a recorder server such as those shown in FIG. 4. The system of FIG. 4 is similar to that shown in FIG. 2, except for the addition of an extended storage 590. The extended storage 590 may be implemented with any suitable storage device, e.g., a tape archive system, a network line file store, etc., connected to the server 500.

According to an exemplary embodiment, a user having "modify" or "full control" rights, such as a system administrator or supervisor, may configure when archiving should occur and what part of a contact to archive. For example, the user may determine the number of days after the association between a contact and a contact folder that archiving should occur. Also, the user may determine what content in the contact to archive, e.g., whether to archive audio data, video data, or audio and video data. Metadata included in the contact may also be archived. For simplicity of explanation, the text below refers mostly to archiving of selected content.

"In addition to or instead of the user, the server 500 may be responsible for determining when to archive contacts. For example, the server 500 may perform regular archiving of content. The server searches the database for contacts ready to be archived. The contact is ready to be archived when a contact folder's association to a particular contact has expired. This means, for example, that the difference between the association's last modified data and the current date exceeds the configured number of days to wait until archiving. If a particular contact has multiple folders associations, the first association to expire may trigger the archive. The step of archiving may be performed at the earliest of the expiration times and dates."

Once a list of contacts needing to be archive is obtained, the server 500 instructs the recorder server 540 to begin archiving. The recorder server 540, in turn, interfaces with the extended storage 590 to copy content from the local drive, which may be a hard disk drive in the server 540 or any other shared hard disk drive, onto the extended storage's medium. The process of archiving may be performed in the background, in a manner that is transparent to the user.

When archiving is complete, the database is updated by the server 500 to reflect the archived status. According to one embodiment, a contact's content properties may be modified, and the association may be hidden.

If all associations for a contact have expired, the content and/or metadata associated with the contact may be dismissed by the server instructing the recorder server to dismiss the contact.

According to an exemplary embodiment, content that is not archived may be purged during the archive process. For example, when the archive process begins for a contact with both audio and video content, but the configuration is to only archive audio content, the video content is purged when the archive process is completed.

Figure 5:
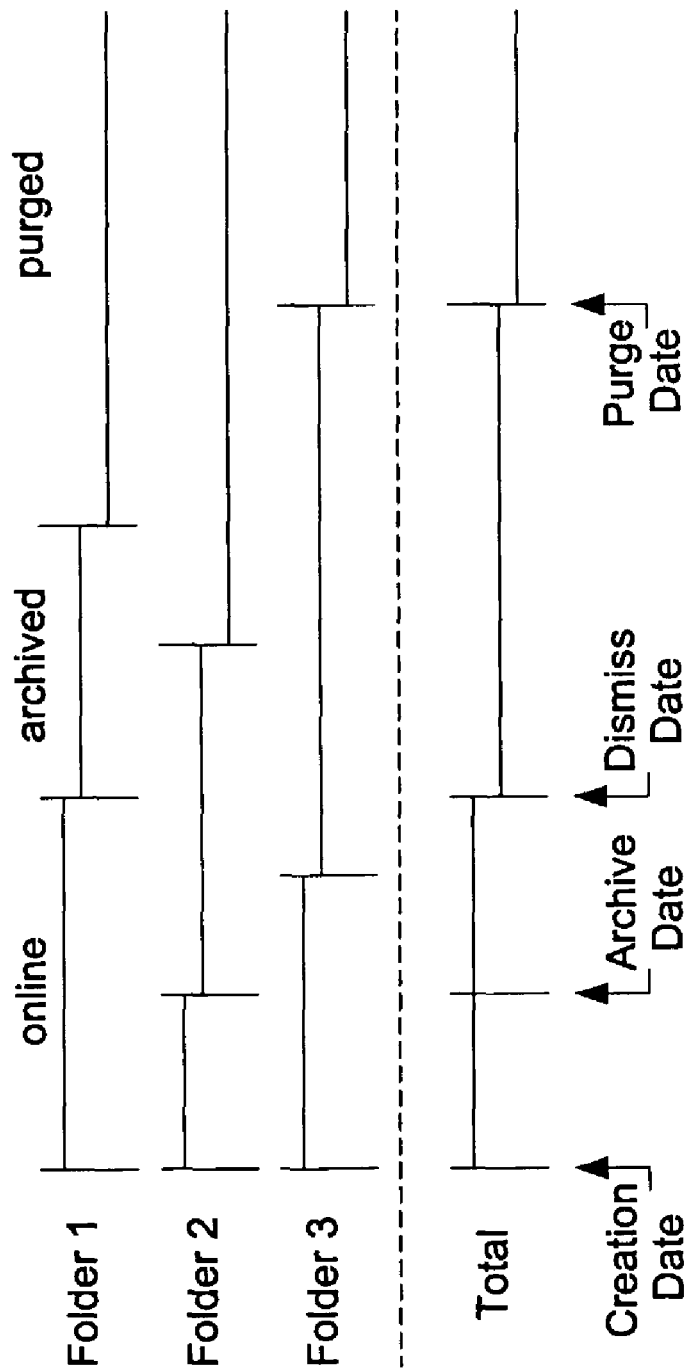
FIG. 5 illustrates an exemplary timeline for archiving, dismissing, and purging of multiple contact folder associations.

A contact may have an association with multiple folders, and each association may have different archive, dismiss and purge dates. Therefore, according to an exemplary embodiment, archiving, dismissing, and purging may be performed according to a timeline including a union of all association's archive and purge dates. An exemplary timeline is shown in FIG. 5.

According to one embodiment, the time to archive is determined by the first archive date in the union of contact folder associations. For archiving, the first date is used as a reliability measure such that once an archive date and time have passed in any folder, at least the selected content is archived. If the archive was postponed until the last date in the union, one folder could prevent the archive from occurring for a considerably long time after some of the other folders required to be archived.

The time to dismiss the content may be determined by the last archive date in the union. This keeps the content "online" or stored in the local storage until all associations have expired. This allows playback within any folder whose association has not expired.

The time to purge may be determined by the last purge date in the union. This keeps the archived content available until the last purge date for all of contact folder associations.

Referring to the exemplary timeline shown in FIG. 5, for each association, the content is configured to be online when the upper line is present, archived when the middle line is present, and purged when the lower line is present. In FIG. 5, three contact folder associations are represented. Each association has different archive and purge dates. As indicated in FIG. 5, archiving occurs at the first archive date, which is associated with folder 2. Dismissing occurs at the last archived date, e.g., the date associated with folder 1. Purging occurs at the last purge date, which is associated with folder 3.

Figure 6:
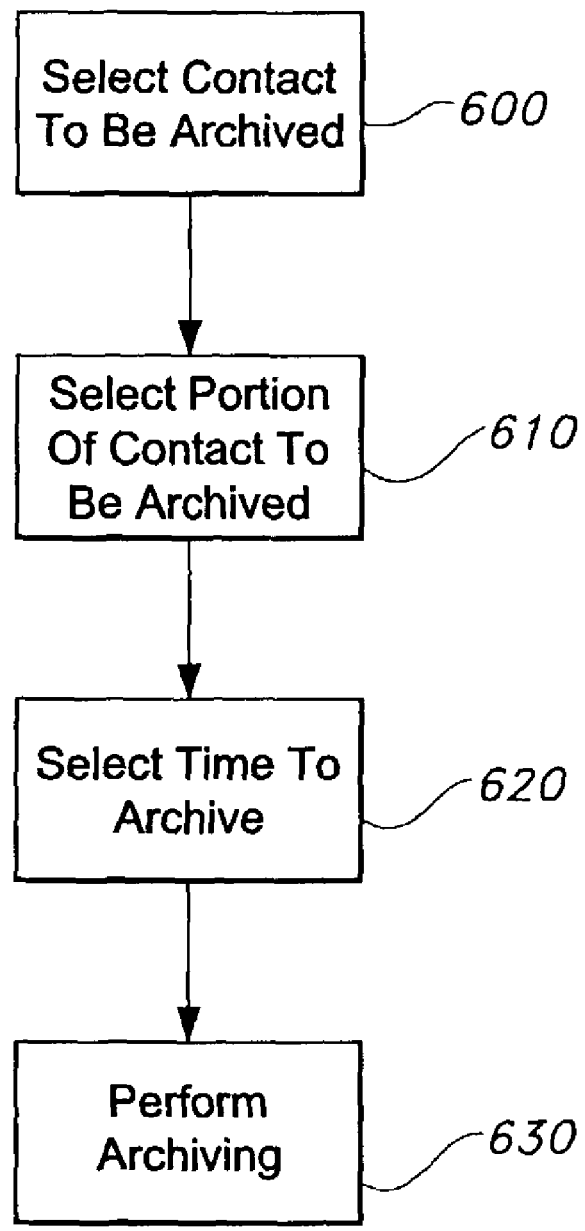
FIG. 6 illustrates an exemplary method for archiving contacts.

FIG. 6 illustrates a method for archiving contacts according to an exemplary embodiment. The method begins at step 600 at which at least one contact is selected to be archived. At step 610, a portion of the contact is selected to be archived. For example, audio and/or video content included in the contact may be selected to be archived. Associated metadata may also be selected to be archived or may be automatically archived. At step 620, a time for performing archiving is selected. This may include a particular date and time. Steps 610 and 620 may be performed in any order or at the same time. At step 630, the selected content (and metadata) is archived at the determined time.

For restoring archived content and/or metadata, a user may perform a contact search, specifying the search criteria and the archive content to be included. The user's criteria is gathered and submitted to the database.

According to an exemplary embodiment, the first request to the database requests only the number of contacts to be returned. If the number of contacts is large, e.g., over 100 contacts, a dialog box may be presented to the user with the option of aborting the search or returning all the contacts. If the user requests all contacts, a second request may be made that returns the set of contacts. If the number of contacts is small, e.g., less than 100 contacts, a second request may be immediately made that returns the set of contacts.

Once a list of contacts has been returned from a search, if one or more of the contacts are selected, the user may "copy" the selected requests into a specific folder. This "copy" really amounts to the creation of a folder association for each contact selected. If an association for the selected contact already exists in the folder, its "last modified" time may be updated to the when the "copy" occurred. If the association is hidden, it may be made visible.

According to an exemplary embodiment, if, during a "copy", one or more of the contacts has content that is not online but is archived, the user may choose to return no content, only part of the content (audio or video), or all of the content. If the user chooses to restore no content, then no additional work is done, and the contacts appears in the folder's contact list with the indication that there is archived content. If the user chooses to restore the content, a request is made to the server 500 to restore a given set of contacts. The server may perform some check to assure that the content is available.

For example, if a user selects some contact with archived audio content but not video content, and the user then requests that only video content be restored, the user is informed that the selection has filtered out all contacts, and a restore request is no submitted. If at least one of the contacts has archived video content, however, a request for the contact that actually has archived video is submitted. The other contacts without archived video may still be "copied" in to the destination folder.

According to another embodiment, when the user chooses to restore content, the content that was archived is automatically restored, regardless of the type of content. According to this embodiment, the user does not choose which archived content to restore.

The restore request may be queued and subsequently executed by processing thread in the server. The server 500 takes the request, queries the database for any necessary information, and passes the request to the recorder server 540 in a function call that runs immediately. According to an exemplary embodiment, the recorder server 540 asynchronously performs the restore, notifying the server 500 with two categories of messages: time-level and batch-level. A time-level message provides updates for each time in the batch (successful restore, failed restore, e.g.). Batch-level messages provide updates to the database as a whole (complete, suspended, etc.).

For a successful restore notification, the server 500 updates the database 530 to reflect the new availability of content. For a failure restore notification, the server updates the database to reflect the inability to restore the content. For a suspended restore notification, e.g. when the recorder server 540 doesn't have immediate access to the data, which may happen if the tape holding the data is not currently loaded on the tape drive, the server 540 updates the database 530 to reflect the suspension in restoring the content. Since the situation causing the problem can be easily fixed, e.g. loading the tape, a suspension is not considered a failure.

According to an exemplary embodiment, once a request has been suspended, the only way to resume the request is through manually requesting the server attempt the restore again (presumably after correcting the situation that caused the suspension in the first place).

When a particular item in a batch is suspended, the recorder server 540 may continue processing the rest of the batch. The recorder server then continues processing other batches in its queue.

On a batch-level notification, the server emails the user (and possibly an IT administrator) a summary of the restore process. This summary includes how many items were restored successfully, how many failed, how many were suspended, and an itemized status report for each item in the batch. An email may be sent to an IT administrator if any of the items were suspended.

When the recorder server 540 receives a request to perform a restore, it interacts directly with the extended storage system 590. The request to the recorder server may contain a batch of one or more content items to restore. This batch is passed directly to the extended storage 590, with slight modifications to the batch's data to match the needs of the extended storage system.

According to an exemplary embodiment, the extended storage 590 may include and/or support functionality that may be used to increase the efficiency of the restore (such as a tape system organizing the items in the batch based on location on the tape). In the end, the content is copied from the extended storage system onto a local storage, such as a hard disk drive in the recorder server 540.

According to one embodiment, a user may cancel a restore request in, e.g., the client or in a separate restore manager utility. The server may completely cancel any request for which processing has not started. For a process currently being processed, an individual restore may be cancelled.

According to this embodiment, when the server receives a cancel restore command, it does one of two things depending on if the given restore is currently being processed. If the restore is not currently being processed, the restore is removed from the queue and an email is sent to the requesting user with a summary of the restore process, and this summary will state all the items in the restore were cancelled. If the restore is currently being processed, the server sends a cancel current restore command to the recorder server, which stops processing the current restore after completing the current item. Asynchronous notifications are still given for each item in the restore, with "cancelled" notifications going out for all post-cancel-request items in the restore. A final "batch complete" notification is sent out, at which point the server may email the requesting user with the summary of the restore process.

If a playback is attempted of a contact with archived content, the archived content appears to not exist. In this scenario, queries to the database may not return information other than that content exists (implying it is online) or content doesn't exist (implying it is archived or truly doesn't exist). Requests to the server to playback content that is not on its local storage will fail. The archived contact may be restored, however, and then the restored content may be played back from the local storage.

Figure 7A:
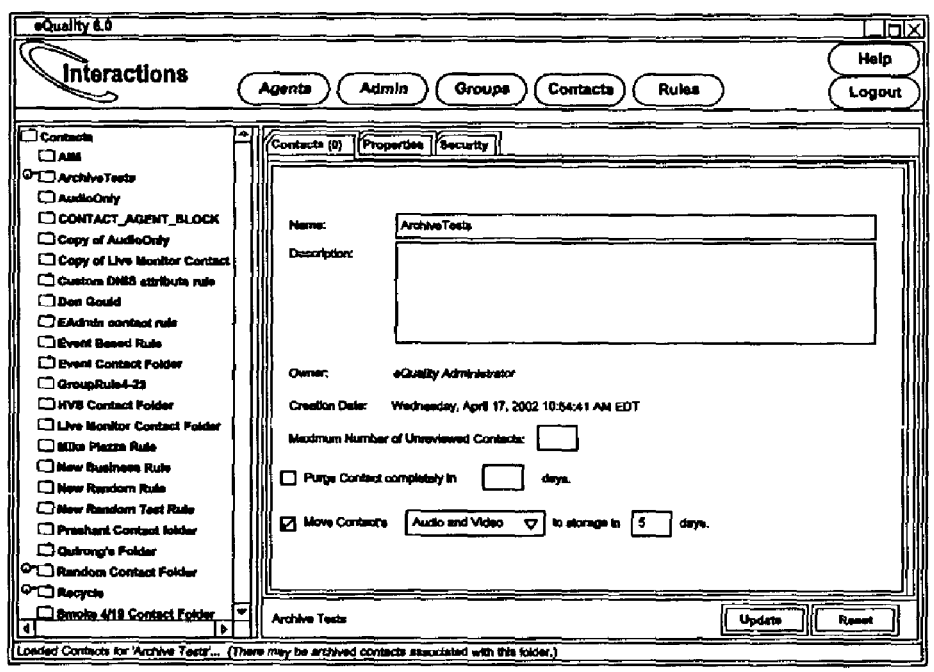
FIGS. 7A-7G illustrate exemplary screen shots for managing archiving of contacts and restoring of archived contacts.

FIGS. 7A-7F illustrate exemplary screens for managing archived contacts. In particular, FIG. 7A illustrates an exemplary screen shot for configuring archiving, and FIGS. 7B-7F illustrate how an archived contact may be restored. It will be appreciated that these screens are shown by way of example only, and the invention is not limited to configuring, retrieving and restoring contacts in the manner described with reference to these screens.

Referring to FIG. 7A, an Archive contact is included on the left of the screen. Upon selecting any contact folder, the properties tab shown in the right portion of the screen is displayed. This screen allows the user to indicate when a contact should be archived and/or purged and what part of the content should be archived. In the example shown, contacts in the "Archive Tests" folder are configured to have the "audio" and "video" content archived after 5 days.

Figure 7B:
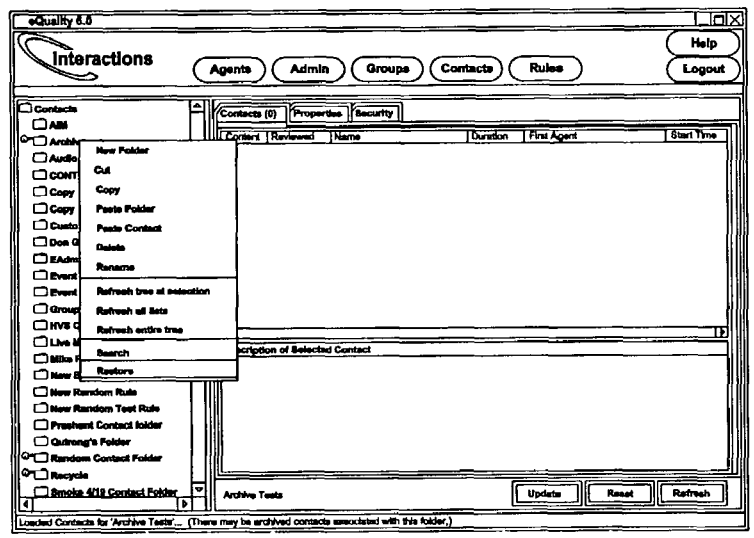
Figure 7C:
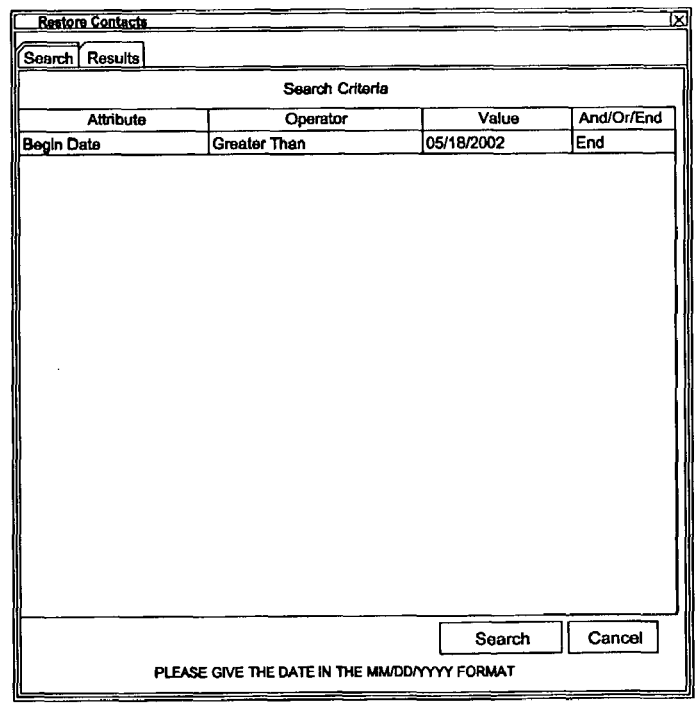
Figure 7D:
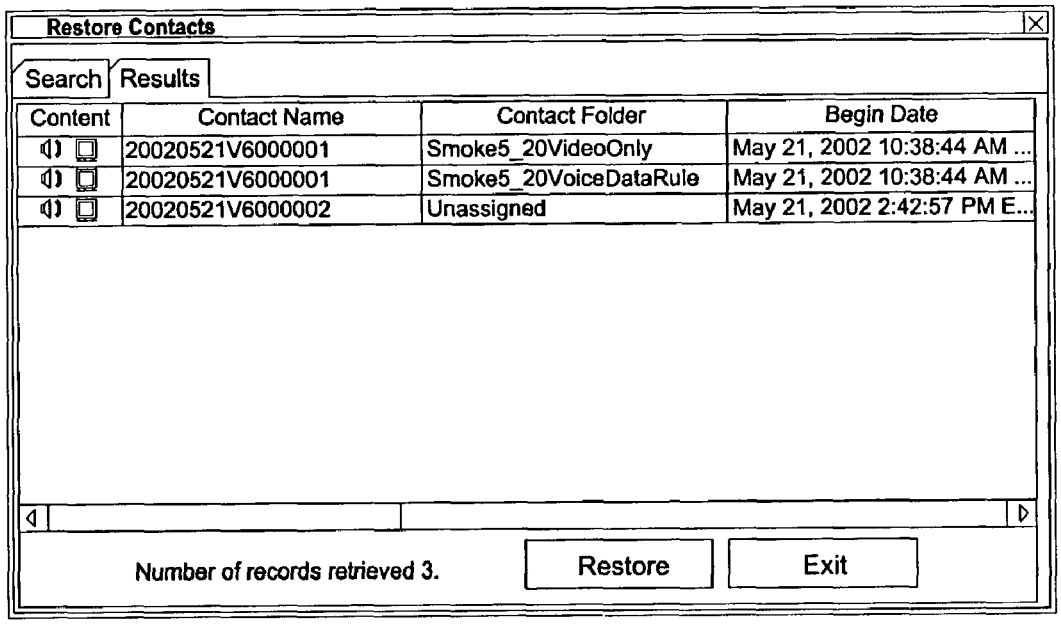

According to an exemplary embodiment, right clicking on a contact folder brings up a menu such as that shown in FIG. 7B that contains options to "Restore" and "Search". When the "Restore" option is selected, the screen shown in FIG. 7C is displayed. Using this screen, search criteria may be entered. Then, by clicking on "search", the results screen shown in FIG. 7D is displayed. The results displayed include on-line contacts and archived contacts. These contacts may be listed with different folder icons for on-line contacts and archived contacts, thus allowing a user to easily determine what contacts are archived.

Figure 7E:
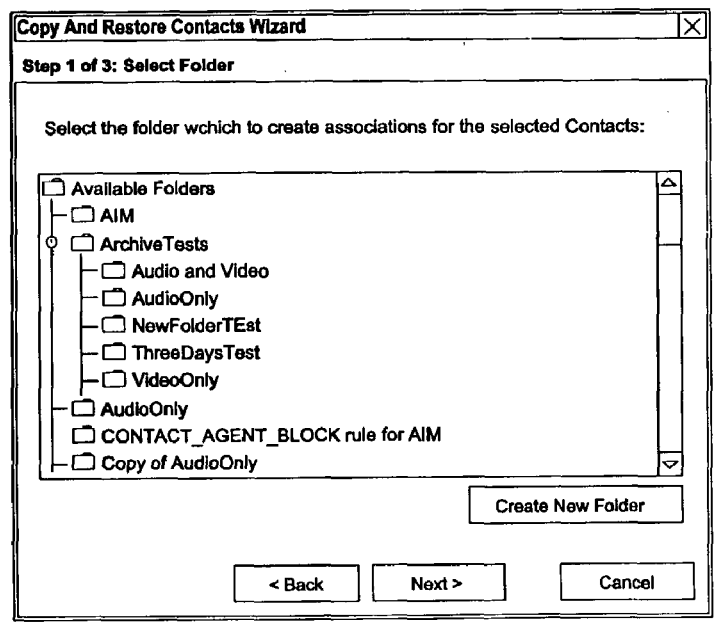
Figure 7F:
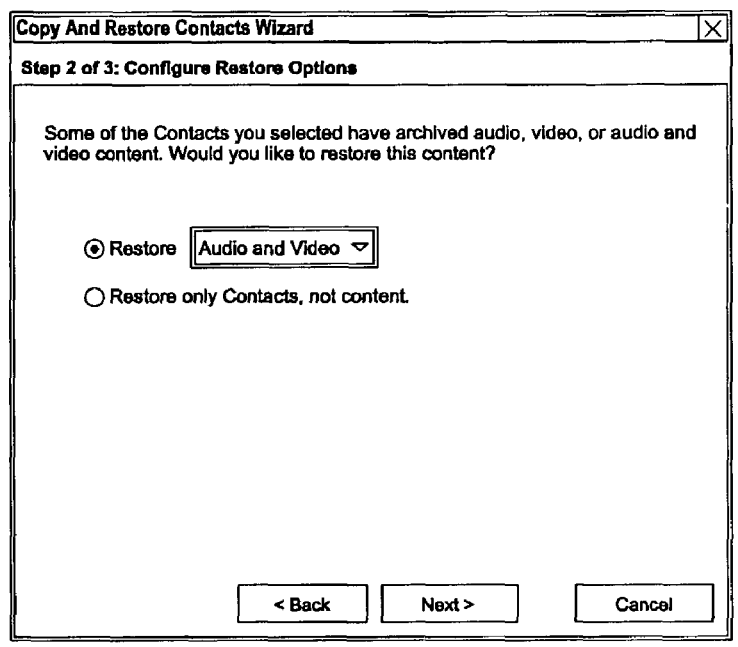
Figure 7G:
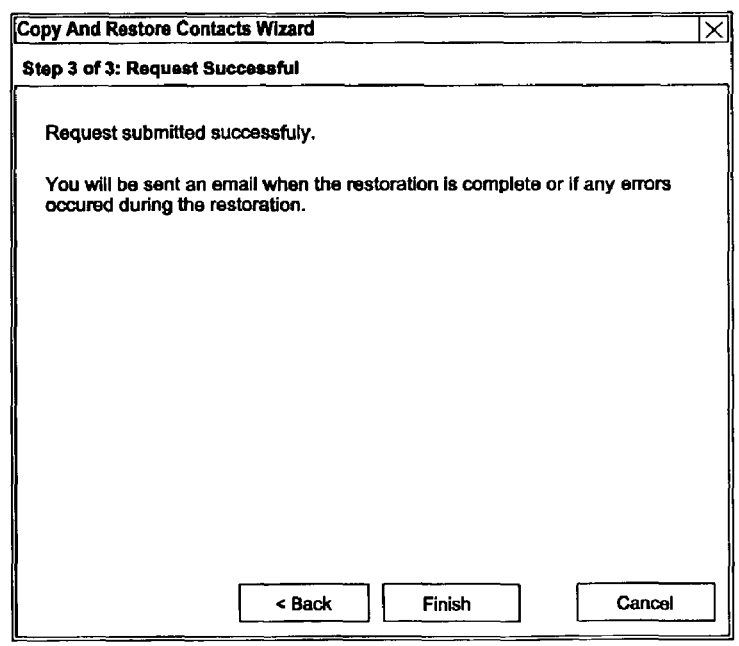

By selecting one or more contacts shown in FIG. 7D and then clicking the "Restore" button, the "Copy and Restore Contacts Wizard" is launched, as illustrated in FIGS. 7E-7G. These screens relate to a three step copy/restore process. The first step is to select or create a contact folder for which the new contact folder association for the restored contact will be created, using the screen shown in FIG. 7E. Then, the content that was archived is restored.

According to one embodiment, options for restoring may be configured using a screen such as that shown in FIG. 7F. For example, a user may select what content within a contact to restore. Alternatively, all the content that was archived may be restored.

Next, using the screen shown in FIG. 7G, feedback regarding whether or not the request was successfully submitted is provided. The user may subsequently be notified via, for example, e-mail, of the status of the requested submission.

Referring again to the screen shown in FIG. 7A, if a user selects the "Search" option, a similar process is launched as described above with regard to the "Restore" Option. The Search process differs in that it does not include archived contacts. Also, while the "Restore" process only allows the selected contacts to be restored, the "Search" process allows a user to go to a contact, review the contact, and export the contact.

Figure 8:
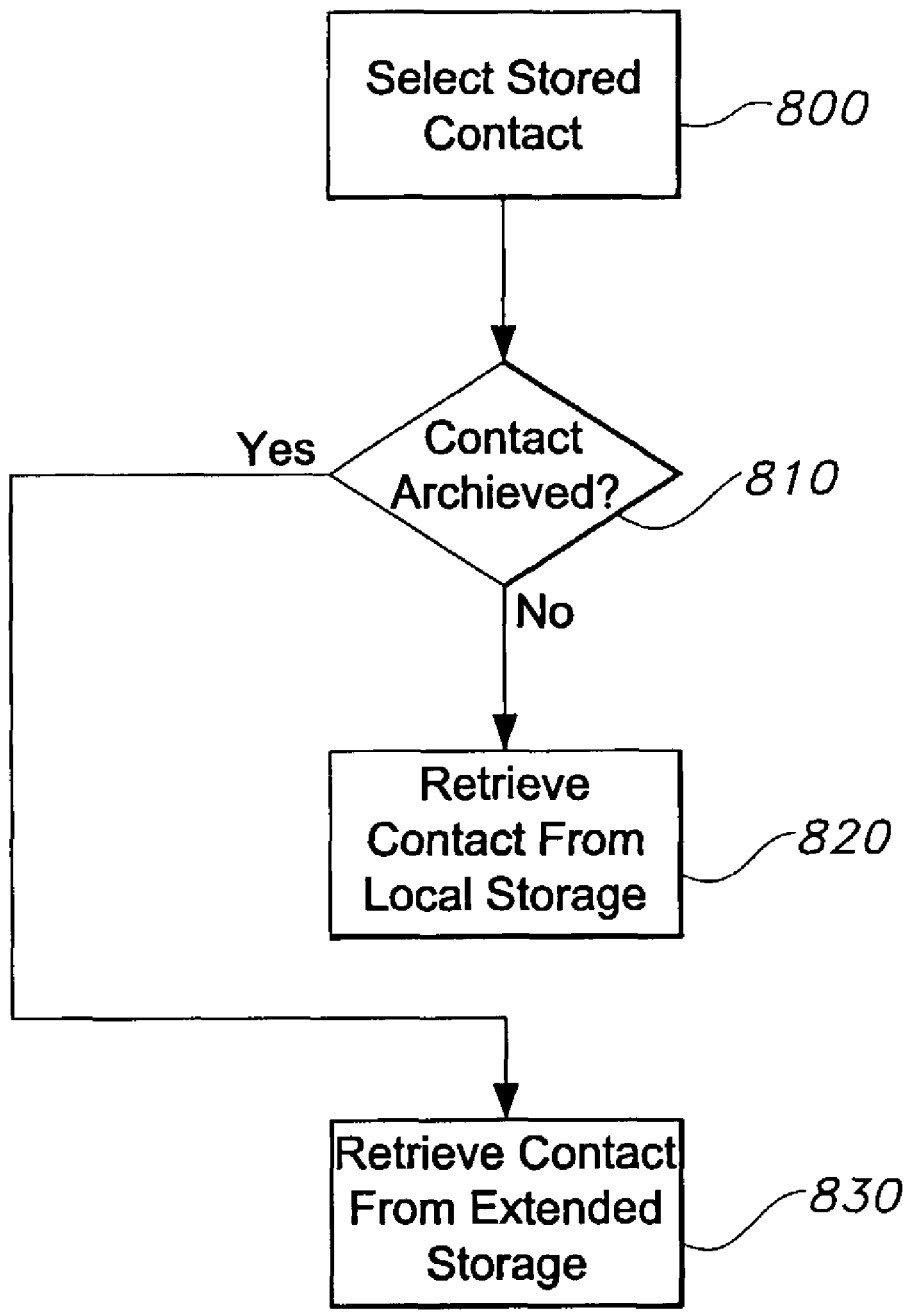
FIG. 8 illustrates an exemplary method for retrieving stored contacts.

FIG. 8 illustrates a method for retrieving archived data according to an exemplary embodiment. The method begins at step 800 at which a stored contact is selected using, e.g., a contact list as displayed in FIG. 7A. Next, a determination is made at step 810 whether or not the contact is archived. If the contact is not archived, the contact is retrieved from the local storage at step 820. If the contact is archived, the contact is retrieved at step 830 by copying the contact from the extended storage to the local storage and then retrieving the contact from the local storage as described above.

According to exemplary embodiments, methods and systems are provided for archiving recorded interactions and for retrieving stored interactions in an efficient manner.

It should be understood that the foregoing description and accompanying drawings are provided as examples only. A variety of modifications are envisioned that do not depart from the scope and spirit of the invention. The above description is intended by way of example only and is not intended to limit the present invention in any way.

What is claimed is:

1. A method for archiving at least one contact between at least one server and at least one user, wherein the at least one contact includes a recorded interaction between a customer and a contact center agent via the at least one server, the method comprising the steps of:

capturing and storing a plurality of contacts into one or more folders in a local non-volatile data store, each of the plurality of contacts comprising interactions captured and stored in the local non-volatile data store based upon the application of business rules to the interactions, wherein the business rules are configured using information acquired from an external source in business rules definition process to capture the plurality of contacts and each of the plurality of contacts is grouped into one or more categories based on the business rules, each of the one or more categories containing properties for accessing one or more of the plurality of contacts within the same category;

accessing one or more predetermined rules, the one or more predetermined rules comprising an archive date to configure when archiving should occur, and specifying at least a portion of the contact to be archived;

determining the at least one contact to be archived from among the plurality of contacts, wherein the at least one contact is associated with the one or more folders, the determination being based upon an expiration of an association of the at least one contact and the one or more folders;

selecting a portion of the at least one contact to be archived; and archiving the selected portion of the at least one contact in an extended storage based upon the determination, the at least one contact including content and associated metadata based upon the one or more predetermined rules.

2. The method of claim 1, wherein the interaction is recorded as a contact based upon meeting at least one predetermined business rule.

3. The method of claim 2, wherein all contacts that satisfy a particular business rule are associated with a particular predetermined rule.

4. The method of claim 1, wherein the content includes audio data, video data, multimedia data, or a combination of audio data, video data and multimedia data.

5. The method of claim 1, wherein the step of archiving includes archiving the content and the associated metadata based upon the one or more predetermined rules.

6. The method of claim 1, wherein the step of archiving includes archiving only the content based upon the one or more predetermined rule.

7. The method of claim 1, further comprising purging any portion of contacts that are not selected for archiving to the extended storage.

8. The method of claim 1, further comprising the steps of:

determining whether the at least one contact includes any other associations with any active folders that comprise the one or more predetermined rules that maintains the contact in the local non-volatile data store;

dismissing the at least one contact from the local non-volatile data store based on the determination.

9. The method of claim 8, wherein the at least one contact is associated with one or more folders and each of said one or more folders comprises the one or more predetermined rules, and the step of archiving is performed at the earliest of the expiration times and dates.

10. The method of claim 9, further comprising determining when all of the one or more predetermined rules associated with the one or more folders have expired and dismissing the contact from the local non-volatile data store based upon the expiration of all of the predetermined rules.

11. The method of claim 1, wherein the at least one contact is associated with one or more folders each folder comprising the one or more predetermined rules and each of said one or more predetermined rules for the one or more folders comprises a purge time and date, and the method further comprises purging the contact from extended storage when the last purge time and date expires.

12. The method of claim 1, further comprising restoring an archived contact from extended storage, the restoring comprising returning the contact to the local non-volatile data store.

13. The method of claim 12, further comprising restoring an archived contact from extended storage, including restoring archived content associated with the contact and associated metadata.

14. The method of claim 13, further comprising restoring an archived contact from extended storage, the restoring comprising retrieving the copied content from the extended storage and restoring the copied content to the local non-volatile data store.

15. An apparatus for archiving at least one contact between at least one server and at least one user, wherein the contact includes a recorded voice interaction between a customer and a contact center agent via the server, the apparatus comprising:
- means for capturing and storing a plurality of contacts into one or more folders in a local non-volatile data store, each of the plurality of contacts comprising interactions captured and stored in the local non-volatile data store based upon the application of business rules to the interactions, wherein the business rules are configured using information acquired from an external source in business rules definition process to capture the plurality of contacts and each of the plurality of contacts is grouped into one or more categories based on the business rules, each of the one or more categories containing properties for accessing one or more of the plurality of contacts within the same category;
- means for accessing one or more predetermined rules, the one or more predetermined rules comprising an archive date to configure when archiving should occur, and specifying at least a portion of the contact to be archived;
- means for determining the at least one contact to be archived from among the plurality of contacts, wherein the at least one contact is associated with the one or more folders, the determination being based upon an expiration of an association of the at least one contact and the one or more folders;
- means for selecting a portion of the at least one contact to be archived based upon application of the one or more predetermined rules; and
- means for archiving the selected portion of the at least one contact in an extended storage based upon the means for determining, the at least one contact including content and associated metadata based upon the one or more predetermined rules.

16. The apparatus of claim 15, wherein the interaction is recorded as a contact based upon meeting at least one predetermined business rule.

17. The apparatus of claim 16, wherein all contacts that satisfy a particular business rule are associated with a particular predetermined rule.

18. The apparatus of claim 15, wherein the archiving means copies content associated with at least at least one contact and the one or more predetermined rules and forwards the copied content to the extended storage.

19. The apparatus of claim 15, wherein the content includes audio data, video data, multimedia data, or a combination of audio data, video data, and multimedia data.

20. The apparatus of claim 15, wherein the one or more predetermined rules specify that only the content is archived.

21. The apparatus of claim 15, further comprising means for purging any portion of contacts that are not selected for archiving to the extended storage.

22. The apparatus of claim 15, further comprising:
- determination means operable to determine whether the at least one contact includes any associations with any active folders that comprise the one or more predetermined rules that maintain the contact in the local non-volatile data store;
- dismissal means operable to remove the at least one contact from the local non-volatile data store based on the determination.

23. The apparatus of claim 22, wherein the at least one contact is associated with one or more folders and each of said one or more folders comprises the one or more predetermined rules, and the archiving means performs archiving at the earliest of the expiration times and dates.

24. The apparatus of claim 23, further comprising means for determining when all of the one or more predetermined rules associated with the one or more folders have expired and means for dismissing the contact from the local non-volatile data store based upon the expiration of all of the predetermined rules.

25. The apparatus of claim 15, wherein the at least one contact is associated with one or more folders each folder comprising the one or more predetermined rules and each of said one or more predetermined rules for the one or more folders comprises a purge time and date, and the apparatus further comprises means for purging the contact from extended storage when the last purge time and date expires.

26. The apparatus of claim 15, further comprising means for restoring an archived contact from extended storage by returning the contact to the local non-volatile data store.

27. The apparatus of claim 26, further comprising means for restoring an archived contact from extended storage to local non-volatile data store, including restoring content associated with the contact and associated metadata.

28. The apparatus of claim 27, further comprising means for restoring an archived contact from extended storage to local non-volatile data store by retrieving the archived contact from the extended storage and restoring the archived contact to the local storage.

29. The method of claim 1, wherein the selected portion of the at least one contact to be archived is based upon a media type associated with the selected portion of the contact.

* * * * *